US011044332B2

(12) United States Patent
Gauld

(10) Patent No.: US 11,044,332 B2
(45) Date of Patent: Jun. 22, 2021

(54) AUTOMATIC SERVICE LINKAGE BASED ON DISCOVERED USER ACTIVITY PATTERNS

(71) Applicant: NCR Corporation, Duluth, GA (US)

(72) Inventor: Frank Joseph Lamont Gauld, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 347 days.

(21) Appl. No.: 15/471,702

(22) Filed: Mar. 28, 2017

(65) Prior Publication Data

US 2018/0288188 A1    Oct. 4, 2018

(51) Int. Cl.
| | |
|---|---|
| *G06F 15/173* | (2006.01) |
| *H04L 29/08* | (2006.01) |
| *H04W 4/14* | (2009.01) |
| *G06Q 20/10* | (2012.01) |
| *G06Q 20/42* | (2012.01) |

(52) U.S. Cl.
CPC .............. *H04L 67/26* (2013.01); *H04L 67/16* (2013.01); *H04L 67/22* (2013.01); *H04W 4/14* (2013.01); *G06Q 20/10* (2013.01); *G06Q 20/102* (2013.01); *G06Q 20/42* (2013.01)

(58) Field of Classification Search
CPC ......... H04L 67/16; H04L 67/22; H04L 67/26; H04W 4/14; G06Q 20/10; G06Q 20/102; G06Q 20/42
USPC ............. 709/206, 207, 223, 224; 705/39, 40
See application file for complete search history.

(56) References Cited

U.S. PATENT DOCUMENTS

| | | | | |
|---|---|---|---|---|
| 7,693,771 | B1* | 4/2010 | Zimmerman | G06Q 40/00 705/36 R |
| 2008/0275816 | A1* | 11/2008 | Hazlehurst | G06Q 20/102 705/40 |
| 2010/0005024 | A1* | 1/2010 | Schmitz | G06Q 20/102 705/40 |
| 2010/0306094 | A1* | 12/2010 | Homer | G06Q 40/00 705/35 |
| 2015/0127527 | A1* | 5/2015 | Eide | G06Q 20/227 705/39 |
| 2015/0161741 | A1* | 6/2015 | Unser | G06Q 40/12 705/30 |
| 2015/0379486 | A1* | 12/2015 | Verde | G06Q 20/102 705/40 |
| 2016/0071069 | A1* | 3/2016 | Skala | G06Q 20/4016 705/32 |

* cited by examiner

*Primary Examiner* — Johnny B Aguiar
(74) *Attorney, Agent, or Firm* — Schwegman, Lundberg & Woessner

(57) ABSTRACT

A pattern of user activity is discovered and linked to a network service. The pattern is populated with information relevant to an expected activity of the user, and the populated pattern is provided in an automated message to the user. When the user accepts the message, the expected activity is performed on behalf of the user by the network service with the populated information or the expected activity is automatically scheduled for future performance on behalf of the user by the network service with the populated information.

16 Claims, 4 Drawing Sheets

AUTOMATIC SERVICE LINKAGE BASED ON DISCOVERED USER ACTIVITY PATTERNS

BACKGROUND

Businesses have developed a plethora of network-based products for customers to improve customer engagement and reduce expenses. Although customers have embraced many forms of technology (especially web-based and mobile-based technologies), many customers are reluctant to change from that which they have grown accustomed to. As a result, many customers are not fully utilizing technology and products available from their businesses.

SUMMARY

In various embodiments, methods and systems for automatic service discovery and setup are presented.

According to an embodiment, a method for automatic service discovery and setup is provided. Specifically, and in one embodiment, a pattern of activity is discovered for a user. Next, the pattern is linked to a network service. Finally, a message is sent to the user that requests permission for the network service to perform a further activity on behalf of the user based on the pattern.

DETAILED DESCRIPTION

Figure 1:
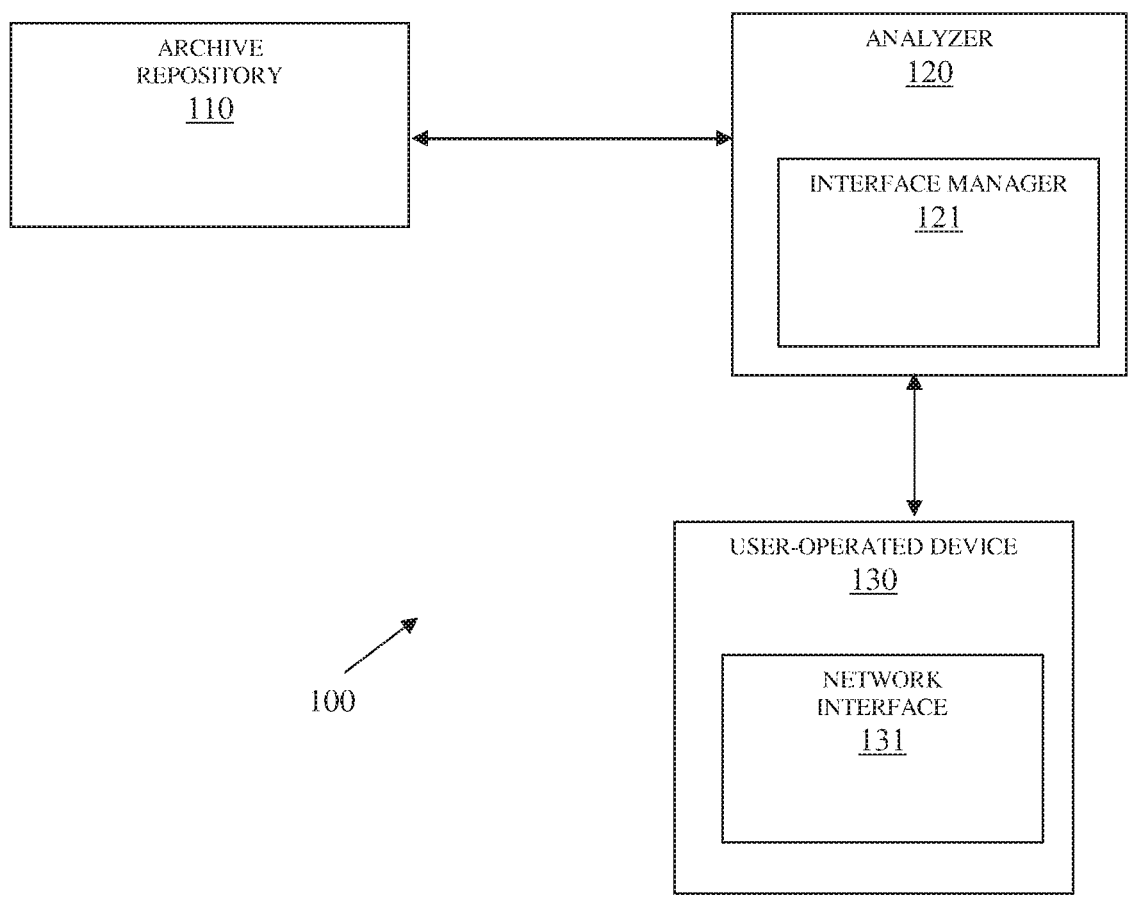
FIG. 1 is a diagram of a system for automatic service discovery and setup, according to an example embodiment.

FIG. 1 is a diagram of a system 100 for automatic service discovery and setup, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the automatic service discovery and setup techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for automatic service discovery and setup can be implemented in all, or some combination of the components shown in different hardware computing devices having one or more hardware processors.

The system 100 includes: an archive repository 110, a network-based analyzer 120 ("analyzer" hereinafter) having a network-based interface manager 121, and a user-operated device 130 having a network interface 131.

As used herein, the term "customer" may be used interchangeably and synonymously with the terms "user," and/or "consumer."

The system 100 will be described within on context associated with a banking enterprise's check or bill pay service available to the customer from a web-based browser or a mobile application to pay bills.

It is noted that the system 100 can be used for any network-available service provided by an enterprise to a customer and for which the customer does not frequently use or for which the customer infrequently uses. Therefore, although the system 100 is described for a bank's bill pay service, it is to be understood that any enterprise network-based service can be used without departing from the beneficial teachings presented herein.

The archive repository 110 includes a history of transactions that the customer has with the enterprise. For example, when the customer withdraws funds from an account or writes a check from an account, a record is created in the repository 100 that identifies, by way of example only: the customer through a customer identifier/number or an account number along with a type of transaction, a date and time of the transaction, and when the transaction was a check transaction the name and address (if available) of the payee of the transaction when the transaction included the customer as the payor for the transaction. It is noted that this is again used for purposes of illustration and that a variety of other transaction types and transaction data may be captured in the repository 110 and identified as belonging to the customer (through the customer identifier and/or account number).

The repository 110 may reside within the enterprise or may be cloud based. In some cases, the repository 110 may be managed by a third-party that contracts with the enterprise to house the enterprise's customer transaction data within the repository 110.

The analyzer 120 resides on a server or in a network-based cloud processing environment and executes on one or more hardware processors of the server or network-based cloud processing environment hardware devices. In an embodiment, the analyzer 120 executes within a processing environment controlled by the enterprise. In an embodiment, the analyzer 120 executes remotely over a network connection from the processing environment of the enterprise as a third-party service to the enterprise. In an embodiment, the analyzer 120 processes within a Virtual Machine (VM) that executes or is overlaid on top of one or more hardware devices having hardware processors for execution of the VM (with the VM processing the analyzer 120).

The analyzer 120 is configured to identify patterns in the repository 110 for a specific transaction type of the customer from the customer's history of transactions that reside within the repository 110.

For example, the analyzer 120 can take as input text parameters that identify the transaction type as being physical checks written by the customer and processed through the enterprise (bank) to payees. The input text may also identify a date period for which the physical checks written by the customer are to be analyzed for a pattern. Furthermore, the input text may identify conditions for which a pattern is to be noted, such as a recurring check written to a particular payee (such as a utility company). The recurring period can be of any frequency, such as once per month, once per quarter, twice monthly, etc.

Once a pattern is identified that matches parameters identified as the input to the analyzer 120, the analyzer 120 determines if the checks for a given pattern occur with a fixed or variable payment amount. For example, an insurance company payee may receive a fixed quarterly payment amount whereas a utility payee may receive a variable monthly payment amount.

The analyzer 120 may also attempt to identify the payees of any given pattern within the check history through a lookup table with known payees, such as a known utility company at a known payment address.

With the patterns determined from the check history of the customer and with any additional information resolved and added (such as variable payments and known payees), the analyzer 120 communicates the patterns with the added information to the interface manager 121.

The interface manager 121 executes on one or more hardware processors and can be on a server, cloud processing environment, and/or processed within a VM on the server or cloud processing environment (similar to the analyzer 120).

The interface manager 121 is configured to interact with a network-service of the enterprise, such as a bank's web-accessible service or a bank's mobile-application service (available to customers through the customers' mobile devices). The interface manager 121 uses an Application Programming Interface (API) to interact with and communicate with the network-service of the enterprise.

The interface manager 121 can cause the network service to set reminders and send messages to the customer when the customer is logged into the network service or when the customer is not logged into the network service through dynamically pushed messages (to any mobile application) or through other mechanisms such as Short-Message Service (SMS) text messages to a mobile phone of the customer.

The messages are configured to entice and automate the customer's use of a service (bill pay feature of the bank) that is available through the network service of the bank. So, if a pattern communicated from the analyzer 120 to the interface manager 121 identifies that an insurance company receives a quarterly physical check from the customer in the amount of $200 at the end of quarter (March, June, September, December), the interface manager 121 sends a message to the customer (when the customer logs into the banking service or through out-of-band mechanisms) at a configured period of time before the end of next quarter. The reminder is set, such that the interface manager 121 can send the message at the configured period of time that precedes when the insurance company is to receive another physical check from the customer.

So, if the customer just mailed a physical check on Dec. 31, 2016, the reminder is set for Mar. 15, 2017 and on Mar. 15, 2017 the customer operating the device 130 receives through the network interface 131 (or through a SMS message) a message that states, as an example, "we see you regularly write checks to your insurance company on a quarterly basis in the amount of $200, if this is correct your next check is due in two weeks, would you like to have this check automatically processed through our bill pay service." The details of the payee and amount and the customer's information typically appearing on the check can be reproduced for the customer's automated acceptance with a single click of an option presented in the message through the network interface 131.

If the customer had never enrolled in the bill pay service, then an enrollment screen can be presented if the customer selects the option in the message to pay the bill owed to the insurance company. This only needs to occur the first time the customer engages in the bill pay service. The enrollment and already be prepopulated with the customer's information (obtained through the customer's account records with the bank), such that the customer only needs to read the appropriate legal disclosure for enrollment and select an option acknowledging and accepting the terms and conditions of the bill pay service.

Each time a customer has an identified pattern for a past history of physical checks recognized by the analyzer 120 and a reminder set with the interface manager 121, the customer receives a dynamic reminder for paying the bill through the bill service of the bank.

The customer receives the messages through the customer-operated device 130, which can be: a processor-enabled and network-enabled wearable device (such as a watch or goggles), a tablet computer, a laptop computer, a desktop computer, a mobile phone, an intelligent appliance that is part of the Internet-of-Things (IoTs), and the like.

The interaction with the customer that occurs between the customer and the bank is achieve through the network-interface 131 processing on the device 131 and the interface manager 121 over a network connection. The network-interface can be a mobile banking application, a bank's network-accessible website available through browser pages and browser executing on the device 131, or through automated SMS texting (such as by the customer responding to a text message with identified responses, such as Yes, No, etc.

In an embodiment, the interface manager 121 is provided as an extension or enhancement to the network service provided by the enterprise, such as the banking service of the bank.

The customer does not to have been pre-enrolled in the bill pay service of the bank (as stated before) because on the first reminder message sent to the customer, the enrollment and necessary disclosures can occur with the first reminder message. Moreover, the customer does not have to pre-populate out an existing interface set of options to make payments through the bill pay, since that is substantially done for the customer for each recognized pattern of physical checks that the customer has previously written.

In an embodiment, the prepopulated messages for using bill pay to pay a particular payee includes values that can be edited by the customer through a response to the messages. For example for variable payments, the customer can provide as a response to a message a specific dollar amount that the bill pay is to process to a specific payee. This is useful for variable checks to payees, such as utility companies.

The interface manager 121 provides messages to the network interface 131 as automated suggestions or complete suggestions, which the customer can modify or accept with no changes. When the customer provides a response that authorizes the bill pay; the payment is scheduled and made on behalf of the customer, such that the customer does not have to write a physical check for the payment to the designated payee.

In an embodiment, the messages may also provide the customer an option to have a particular payment transaction set to recur at a defined period of time. In this way, the customer does not have to continue to receive messages with regard to a particular recurring payment. In an embodiment, when a recurring payment is made through bill pay on behalf of the customer, the customer receives a notification message that alerts the customer when each payment is made to the payee on behalf of the customer.

The system allows a customer to discover and transition to a network service of an enterprise with little effort (pre-populated information provided to the customer) and in automatic manner (without the customer having to manual interact with the network service only confirmation or minimal customer-driven changes are provided). This makes the enterprise service available to the customer without the customer having to learn the service and interact with its specific interfaces through automated messages. The enterprise transitions the customer to a more cost effective service (bill pay) and the customer's behavior is changed in a manner that is unnoticed and seamless from the perspective of the customer. This is particularly beneficial in the bill pay scenario described above, because there are substantial time delays and expenses associated with banks processing physical checks.

In an embodiment, the messages sent to the customer can also include enticements provided by the enterprise or a payee. For example, if you enroll and use bill pay for your utility company, you can receive a $10 discount monthly on your utility bill. This is beneficial to the payee (utility company) because receiving and depositing checks requires staff to handle, whereas bill pay does not. The enterprise may also offer enticements through the messages, such as $5 per month deposited into the customer's savings account. Still further, offers can be communicated through the bill pay with companies that the enterprise has a relationship with. For example, if the customer uses All State® as his/her auto insurance and the bank (enterprise) has a relationship with Nationwide®, the messages may inform the customer that Nationwide® provides a less expensive option to the customer and even provide an analysis (through a link) where information known for the customer is compared to similar customers that use Nationwide®. So, the automated service discovery and setup can also be used for marketing that benefits the enterprise, the customer, and partners with the enterprise.

These embodiments and other embodiments are now discussed with reference to the FIGS. 2-4.

Figure 2:
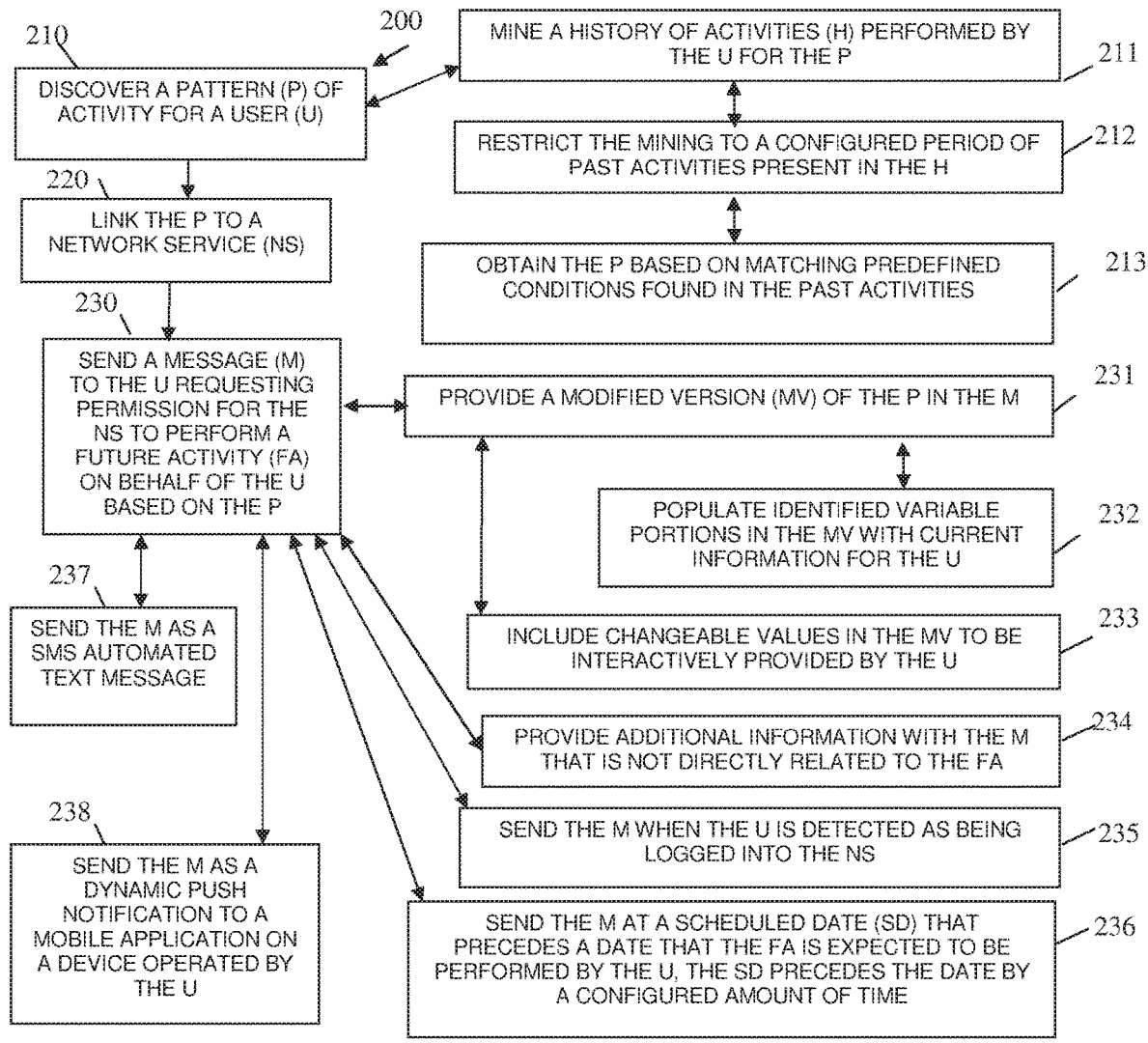
FIG. 2 is a diagram of a method for automatic service discovery and setup, according to an example embodiment.

FIG. 2 is a diagram of a method 200 for automatic service discovery and setup, according to an example embodiment. The software module(s) that implements the method 200 is referred to as a "network-service discoverer." The network-service discoverer is implemented as executable instructions programmed and residing within memory and/or a non-transitory computer-readable (processor-readable) storage medium and executed by one or more hardware processors of a hardware computing device. The processors of the device that executes the network-service discoverer are specifically configured and programmed to process the network-service discoverer. The network-service discoverer has access to one or more networks during its processing. The networks can be wired, wireless, or a combination of wired and wireless.

In an embodiment, the device that executes the network-service discoverer is a server.

In an embodiment, the device that executes the network-service discoverer is a set of cooperating servers or devices organized as a cloud processing environment.

In an embodiment, the network-service discoverer is the analyzer 120.

In an embodiment, the network-service discoverer is all or some combination of the analyzer 120 and the interface manager 121.

At 210, the network-service discoverer discovers a pattern of activity associated with a user. That is, past actions of the user with respect to some type of activity is detected in a pattern. In an embodiment, the past actions are physical checks written by the user and processed through the banking system.

In an embodiment, at 211 the network-service discoverer mines a history of activities performed by the user for discovering the pattern. In an embodiment, the history of activities are housed in the archive repository 110.

According to an embodiment of 211 and at 212, the network-service discoverer restricts the mining to a configured period of past activities present in the history. In an embodiment, the configured period is 12-16 months of past activities of the user. In an embodiment, the configured period is provided as an input parameter to the network-service discoverer.

In an embodiment of 212 and at 213, the network-service discoverer obtains the pattern based on matching predefined conditions found in the past activities. In an embodiment, the predefined conditions are obtained from a storage location or a file. In an embodiment, the predefined conditions are provided as a file reference that is past as a processing parameter to the network-service discoverer.

At 220, the network-service discoverer links the pattern to a network service. In an embodiment, the pattern is associated with a type of activity, such as writing physical checks processed through a bank and recorded in the activity associated with the user by the bank.

At 230, the network-service discoverer sends a message to the user requesting permission for the network service to perform a future activity on behalf of the user based on the pattern. That is, a yet-untaken action of the user is identified based on a recurrence associated with the pattern. This yet-untaken action is the future activity.

According to an embodiment, at 231, the network-service discoverer provides a modified version of the pattern in the message. For example, the modified version may be a populated electronic check image for a physical check that the user is likely to write at the future date but was not written by the user and was generated by the network-service discoverer.

In an embodiment of 231 and at 232, the network-service discoverer populates identified variable portions in the modified message with current information for the user. For instance, the date of the electronic check image and the check number for the electronic image are updated in the modified message with a current date and a current check number provided by the network-service discoverer in variable portions of the message.

In an embodiment of 231 and at 233, the network-service discoverer includes changeable values in the modified version of the message. The changeable values are to be interactively provided by the user in response to receiving the message. For example, the electronic image may be generated for a payee of the user that is a utility company where the amount of the check varies from month to month based on the user's monthly energy consumption. Here, the message can have the paid amount generated by the network-service discoverer by the user.

In an embodiment, at 234, the network-service discoverer provides additional information that is not directly related to the further action. Such examples were provided above with the description of the FIG. 1 and included, a discount off using the network service or an enticement to user a different provider associated with the user; others are foreseeable as well, in fact any marketing information can be provided as the additional information some of which is related to the future action (such as $10 of a utility bill) and some of which is not directly related to the future action (additional cash back for using the network service or enticement to change providers).

In an embodiment, at 235, the network-service discoverer sends the message when the user is detected as being logged into the network service. So, the network-service discoverer may send the message as soon as the user is detected as having authenticated and logged into the network service.

In an embodiment, at 236, the network-service discoverer sends the message at a scheduled date and time that precedes a date that the future action is expected to be performed by the user. The scheduled data precedes the date by a configured amount of time. This is akin to a reminder of the future action being needed to be performed by the user before the future date in which it is due by the user.

In an embodiment, at 237, the network-service discoverer sends the message as an SMS automated text message. Here, the network-service discoverer includes an automated SMS interface to process written text responses received by the user.

In an embodiment, the network-service discoverer sends the message as an automated voice message through a voice-enabled network device, such as Amazon Echo® or Google Home®. Here, the network-service discoverer includes a speech-to-text interface for sending the message to the user as an audio message and receiving authorization and direction from the user through spoken words of the user.

In an embodiment, at 238, the network-service discoverer sends the message as a dynamic push notification to a mobile application on a device operated by the user. In this embodiment, the user need not be logged into the mobile application because some operating systems (OSs) permit network-based dynamic pushes that can wake up and instantiate the mobile application on receipt of the push notification.

Figure 3:
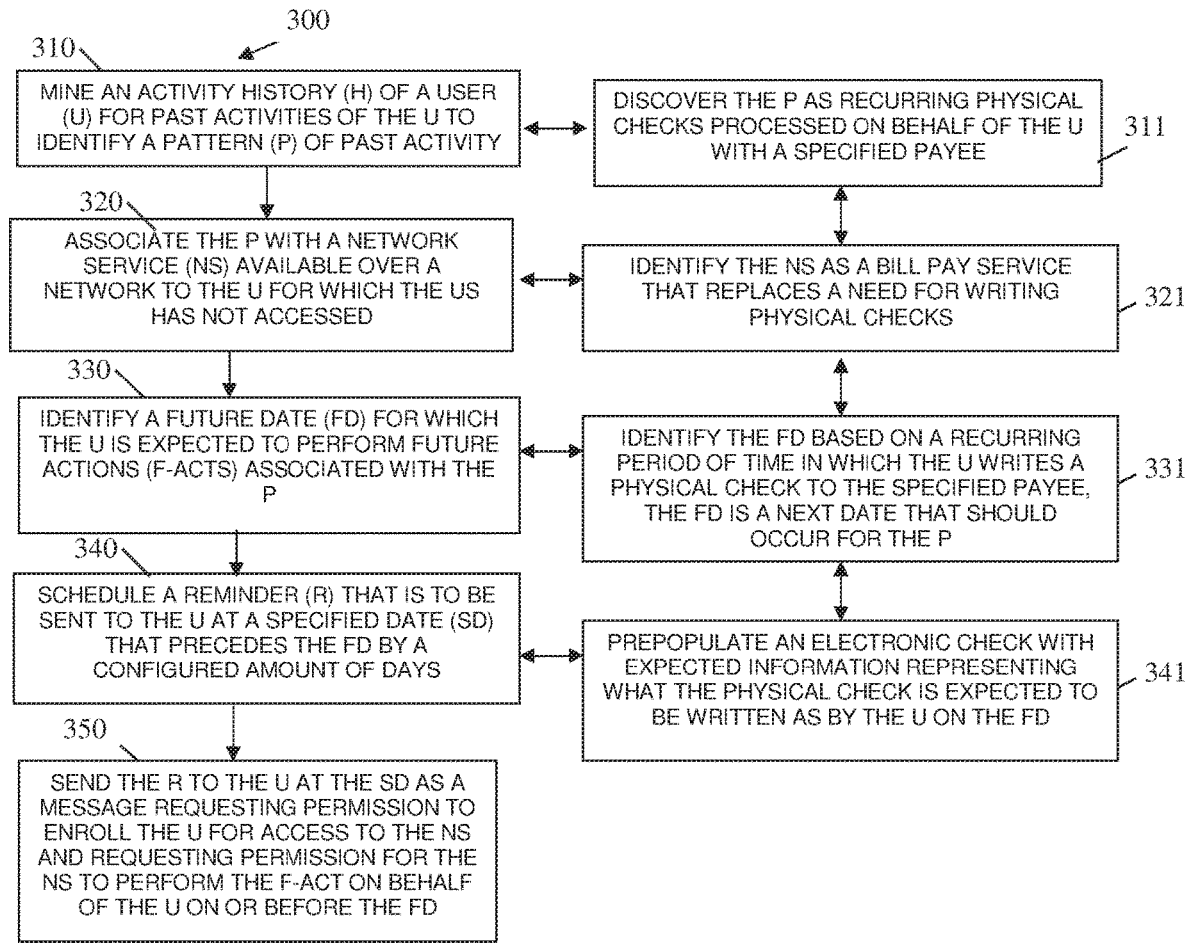
FIG. 3 is a diagram of another method for automatic service discovery and setup, according to an example embodiment.

FIG. 3 is a diagram of another method 300 for automatic service discovery and setup, according to an example embodiment. The software module(s) that implements the method 300 is referred to as a "network-service setup manager." The network-service setup manager is implemented as executable instructions programmed and residing within memory and/or a non-transitory computer-readable (processor-readable) storage medium and executed by one or more hardware processors of a hardware device. The processors of the device that executes the network-service setup manager are specifically configured and programmed to process the network-service setup manager. The network-service setup manager has access to one or more networks during its processing. The networks can be wired, wireless, or a combination of wired and wireless.

The network-service setup manager presents another and in some ways enhanced perspective of the method 200.

In an embodiment, the device that executes the network-service setup manager a server.

In an embodiment, the device that executes the network-service setup manager is a set of cooperating servers or devices organized as a cloud processing environment.

In an embodiment, the network-service setup manager is some combination or all of the analyzer 120 and the interface manager 121.

At 310, the network-service setup manager mines an activity history of a user for past activities of the user to identify a pattern of past activity.

According to an embodiment, at 311, the network-service setup manage discovers the pattern as a recurring physical checks processed on behalf of the user to a specified payee.

At 320, the network-service setup manage associated the pattern with a network service that is available over a network to the user and for which the user has not accessed before or authorized its use before.

In an embodiment of 311 and 320, at 321, the network-service setup manage identifies the network service as a bill pay service that replaces a need for writing physical checks by the user to the specified payee.

At 330, the network-service setup manage identifies a future date for which the u is expected to perform future actions associated with the pattern.

In an embodiment of 321 and 330, at 331, the network-service setup manage identifies the future date based on a recurring period of time in which the user writes a physical check to the specified payee. The future date is a next date that should occur for the pattern (next date that it can be expected that the user will write a physical check to the specified payee).

At 340, the network-service setup manage schedules a reminder that is to be sent to the user at a specified date, which precedes the future date by a configured amount of days.

In an embodiment of 331 and 340, at 341, the network-service setup manage prepopulates an electronic check with expected information representing what the physical check is expected to be written as by the user on the future date. That is, there is no physical check written; the network-service setup manage anticipates the need for the physical check to the specified payee and generates an electronic check with prepopulated information that is expected to be present if the user were to write a physical check.

At 350, the network-service setup manage sends the reminder to the user at the specified date as a messaging that requests permission to enroll the user for access to the network service and requests permission for the network service to perform the future actions on behalf of the user on or before the future date.

Figure 4:
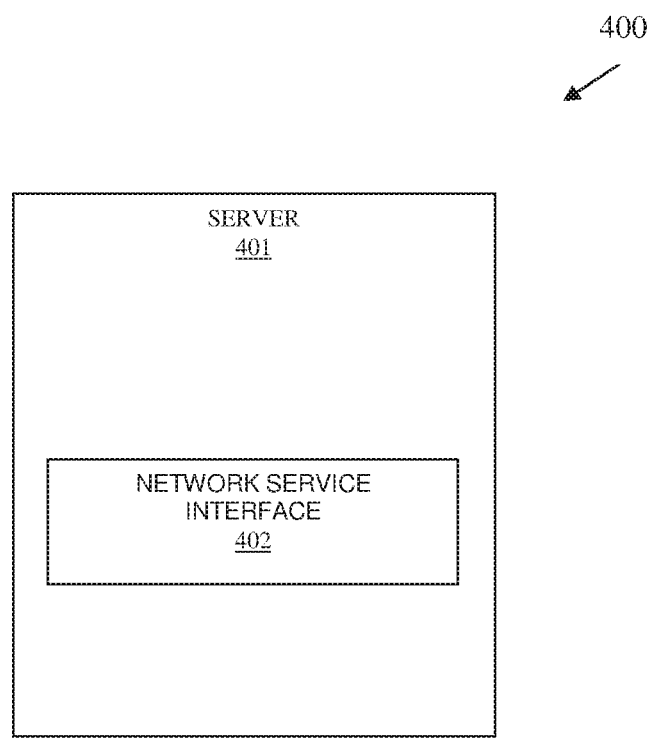
FIG. 4 is a diagram of another system for automatic service discovery and setup, according to an example embodiment.

FIG. 4 is a diagram of another system 400 for automatic service discovery and setup, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a network service interface 402.

The network service interface 402 is configured to: 1) execute on at least one hardware processor of the server 401; 2) identify a pattern expected to recur at a future date from a history of past activities of the user, 3) send a reminder to the user at a date that precedes the future date that asks the user whether a network service can perform actions needed for the pattern by the future date, and 4) perform, by the network service, the actions by the future date when authorized by the user.

In an embodiment, the network service interface 402 is integrated into a bill pay service as an enhancement and the pattern represents a recurring physical check written by the user to a specified payee.

In an embodiment of the latter embodiment, the network service interface 402 is further configured, in 3), to: send the reminder as a prepopulated electronic version of the recurring physical check that is expected to be written by the user by the future date.

In an embodiment, the network service interface 402 is all or some combination of: the processing discussed in the FIGS. 1-3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining records representing processing performed based on activities of a user;
   discovering a pattern of activity for the user from the records by using a type of activity associated with the pattern and conditions defined for the pattern;
   linking the pattern to a network service;
   associating a user-operated device to the network service, wherein the user-operated device has previously not accessed the network service based on the pattern;
   sending a message as a dynamic push notification to a mobile application that executes on the user-operated device requesting permission for the network service to perform a future activity on behalf of the user based on the pattern through the mobile application and a network interface associated with the mobile application and wherein sending further includes:
      providing an option that when activated by the user from the mobile application presents details associated with performance of the future activity and when the user is detected as having never enrolled with the network service, providing, via the mobile application, an enrollment screen prepopulated with customer information of the user and the enrollment screen comprising a second option that when activated by the user from the mobile application accepts enrollment and terms associated with enrollment;
      providing a third option that when activated by the user authorizes automated performance of the future activity to be performed on behalf of the user at a recurring period of time and providing a second notification to the mobile application for each occurrence of performance of the further activity during the recurring period of time as an alert indicating that the further activity has been performed on behalf of the user;
   providing the network service as an integration into a bill pay service as an enhancement, and wherein the pattern represents a recurring physical check written by the user to a specified payee, wherein the recurring physical check when processed on behalf of the user are captured in the records; and
   sending, by the network service, a reminder as a prepopulated electronic version of the recurring physical check to the user-operated device, wherein the recurring physical check is a specific check the user is expected to provide and have processed by a future date.

2. The method of claim 1, wherein discovering further includes mining a history of the activities performed by the user for the pattern, wherein the history of activities include the records.

3. The method of claim 2, wherein mining further includes restricting the mining to a configured period of past activities present in the history of activities.

4. The method of claim 3, wherein restricting further includes obtaining the pattern based on matching the conditions found in the past activities.

5. The method of claim 1, wherein sending further includes providing a modified version of the pattern in the message.

6. The method of claim 5, wherein providing further includes populating identified variable portions in the modified version with current information for the user.

7. The method of claim 5, wherein providing further includes including changeable values in the modified version to be interactively provided by the user through the user-operated device.

8. The method of claim 1, wherein sending further includes providing additional information with the message, wherein the additional information is not directly related to the future activity.

9. The method of claim 1, wherein sending further includes sending the message when the user is detected as being logged into the network service through the mobile application.

10. The method of claim 1, wherein sending further includes sending the message at a scheduled date, wherein the schedule date precedes a date associated with the future activity, and wherein the future activity is expected to be performed by the user, and wherein the schedule date precedes the date by a configured amount of time.

11. A non-transitory computer-readable storage medium comprising executable instructions which when executed by a processor of a server causes the processor to perform operations comprising:
   mining an activity history of a user for past activities of the user to identify a pattern of past activity, wherein mining further includes using a type of activity associated with the pattern and conditions defined for pattern when identifying the pattern from the activity history;
   associating the pattern with a network service available over a network to a user-operated device operated by the user, wherein the user has not previously accessed the network service through the user-operated device;
   identifying a future date, wherein the user is expected to perform future actions associated with the pattern, wherein the future actions when processed for the user are captured as records and the records are updated within the activity history;

scheduling a reminder, wherein the reminder is to be sent to the user-operated device at a specified date, wherein the specified date precedes the future date by a configured amount of days;

sending the reminder as a dynamic push notification to a mobile application that executes on the user-operated device at the specified date as a message requesting permission to enroll the user for access to the network service through a network interface associated with the mobile application and requesting a permission for the network service to perform the future actions on behalf of the user on or before the future date through the network interface of the mobile application, wherein sending further includes providing an option that when activated by the user from the mobile application presents details associated with performance of at least one of the future actions and providing via the mobile application, an enrollment screen prepopulated with customer information of the user and the enrollment screen comprising a second option that when activated by the user from the mobile application accepts enrollment and terms associated with enrollment as the permission, wherein sending further includes providing a third option that when activated by the user authorizes automated performance of the at least one of the future actions to be performed on behalf of the user at a recurring period of time and providing a second notification to the mobile application for each occurrence of performance of the at least one further actions during the recurring period of time as an alert indicating that the at least one further actions has been performed on behalf of the user;

providing the network service as an integration into a bill pay service as an enhancement, and wherein the pattern represents a recurring physical check written by the user to a specified payee, wherein the recurring physical check when processed on behalf of the user are captured in the records; and sending, by the network service, the reminder as a prepopulated electronic version of the recurring physical check to the user-operated device, wherein the recurring physical check is a specific check the user is expected to provide and have processed by the future date.

12. The non-transitory computer-readable storage medium of claim 11, wherein the executable instructions corresponding to the mining further includes discovering the pattern as recurring physical checks processed on behalf of the user with the specified payee, wherein the recurring physical check when processed is updated to the activity history.

13. The non-transitory computer-readable storage medium of claim 12, wherein the executable instructions corresponding to the associating further includes identifying the network service as the bill pay service, wherein the bill pay service replaces a need for writing physical checks by the user.

14. The non-transitory computer-readable storage medium of claim 13, wherein the executable instructions corresponding to the identifying further includes identifying the future date based on a recurring period of time and on the future date the user writes a physical check to the specified payee, wherein the future date is a next date, wherein the next date is associated with a specific date the pattern is expected to occur.

15. The non-transitory computer-readable storage medium of claim 14, wherein the executable instructions corresponding to the scheduling further includes pre-populating an electronic check with expected information representing an expected written check provided by the user on the future date.

16. A system (SST), comprising:
a server; and
a network service interface;
wherein the network service interface is configured to:
execute on at least one hardware processor of the server;
identify a pattern expected to recur at a future date from a history of past activities of a user, wherein the past activities cause processing and the processing is captured as records in the history, wherein the pattern is identified from the records based on a type of activity associated with the pattern and conditions defined for the pattern;
send a reminder as a dynamic push notification to a mobile application that executes on a user-operated device operated by the user at a date, wherein the date precedes the future date and on the date the user is asked through the user-operated device whether a network service associated with the network service interface can perform actions needed for the pattern by the future date;
perform, through the network service, the actions by the future date when authorized by the user through a network interface associated with the mobile application by providing an option that when activated by the user from the mobile application presents details associated with performance of at least one of the actions and when the user is detected as having never enrolled with the network service, providing, via the mobile application, an enrollment screen prepopulated with customer information of the user and the enrollment screen comprising a second option that when activated by the user from the mobile application accepts enrollment and terms associated with enrollment, and by providing a third option that when activated by the user authorizes automated performance of the at least one of the actions to be performed on behalf of the user at a recurring period of time; and
providing a second notification to the mobile application for each occurrence of performance of the at least one of the actions during the recurring period of time as an alert indicating that the at least one of the actions has been performed on behalf of the user;
wherein the network service interface is integrated into a bill pay service as an enhancement and the pattern represents a recurring physical check written by the user to a specified payee, wherein the recurring physical check when processed on behalf of the user are captured in the records;
wherein the network service interface is further configured to: send the reminder as a prepopulated electronic version of the recurring physical check to the user-operated device, wherein the recurring physical check is a specific check the user is expected to provide and have processed by the future date.

* * * * *